(12) United States Patent
Bauchot et al.

(10) Patent No.: US 7,827,846 B2
(45) Date of Patent: Nov. 9, 2010

(54) MONITORING OF WEARING SURFACE LAYER THICKNESS

(75) Inventors: Frederic Bauchot, Saint-Jeannet (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/412,424

(22) Filed: Mar. 27, 2009

(65) Prior Publication Data

US 2009/0205405 A1    Aug. 20, 2009

Related U.S. Application Data

(63) Continuation of application No. 11/255,390, filed on Oct. 20, 2005, now Pat. No. 7,509,834.

(30) Foreign Application Priority Data

Dec. 15, 2004    (EP)    ................... 04300897

(51) Int. Cl.
    *G01N 19/02*    (2006.01)
(52) U.S. Cl. ................... 73/8; 73/7; 73/146; 152/154.2
(58) Field of Classification Search ........................ 73/8, 73/146; 152/154.2
    See application file for complete search history.

(56) References Cited

U.S. PATENT DOCUMENTS 6,340,930 B1 *    1/2002  Lin ........................... 340/447
7,180,409 B2 *    2/2007  Brey ......................... 340/442
2002/0116992 A1 * 8/2002  Rickel ........................ 73/146
2006/0042734 A1 * 3/2006  Turner et al. .............. 152/154.2
2006/0090558 A1 * 5/2006  Raskas ....................... 73/146

FOREIGN PATENT DOCUMENTS

FR    2816887    5/2002

OTHER PUBLICATIONS

Apollo; 1ST-2001-34372; Intelligent Tyre for Accident-free Traffic; Intelligent Tyre Systems—State of the Art and Potential Technologies; 107 pages.
Notice of Allowance (Mail Date Nov. 17, 2008) for U.S. Appl. No. 11/255,390, filed Oct. 20, 2005; Confirmation No. 7316.

* cited by examiner

*Primary Examiner*—Hezron Williams
*Assistant Examiner*—Mark Shabman
(74) *Attorney, Agent, or Firm*—Schmeiser, Olsen & Watts; William H. Steinberg

(57) ABSTRACT

A method of wear level determination and an associated product. Multiple Radio Frequency IDentification (RFID) tags are distributed within a thickness of a wearing surface layer of a tire. The multiple RFID tags include first RFID tags that have not been worn away, second RFID tags that have been worn away, and a special RFID tag that has not been worn away. A measure of wear of the wearing surface layer of the tire is determined from data received from the first RFID tags and from a table in the special RFID tag. The product includes the wearing surface layer of the tire, the multiple RFID tags, and a mechanism for determining the measure of wear of the wearing surface layer.

14 Claims, 12 Drawing Sheets

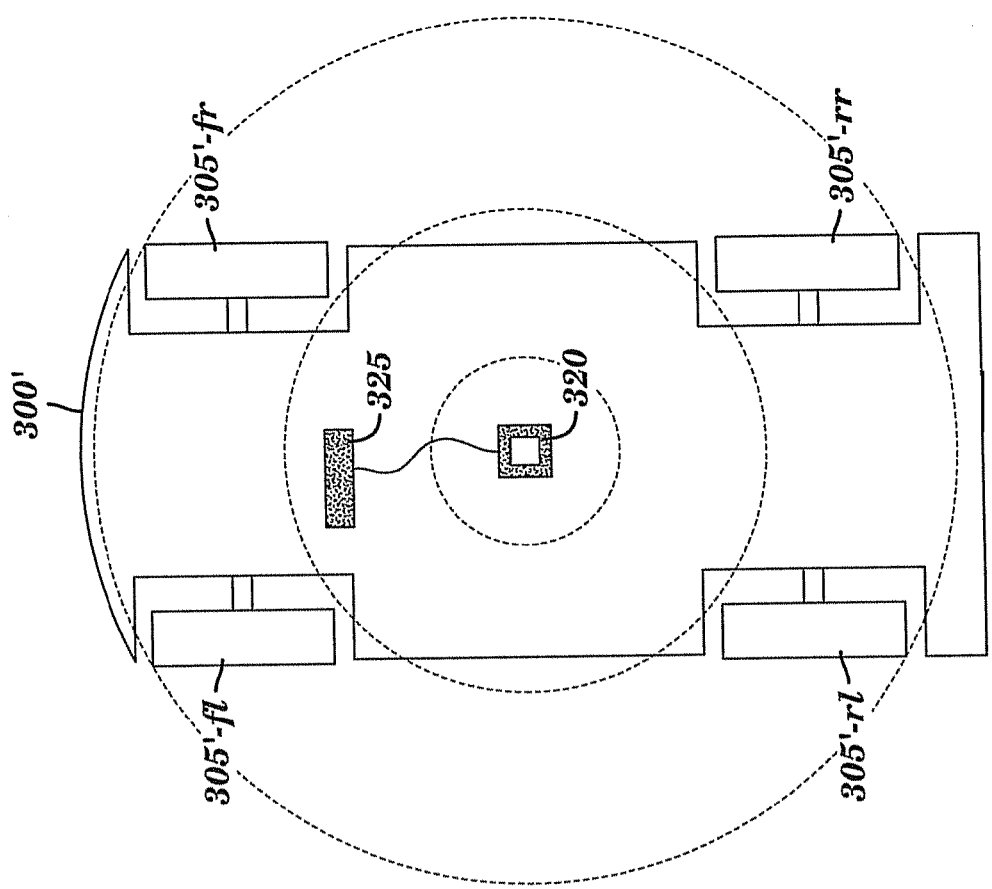
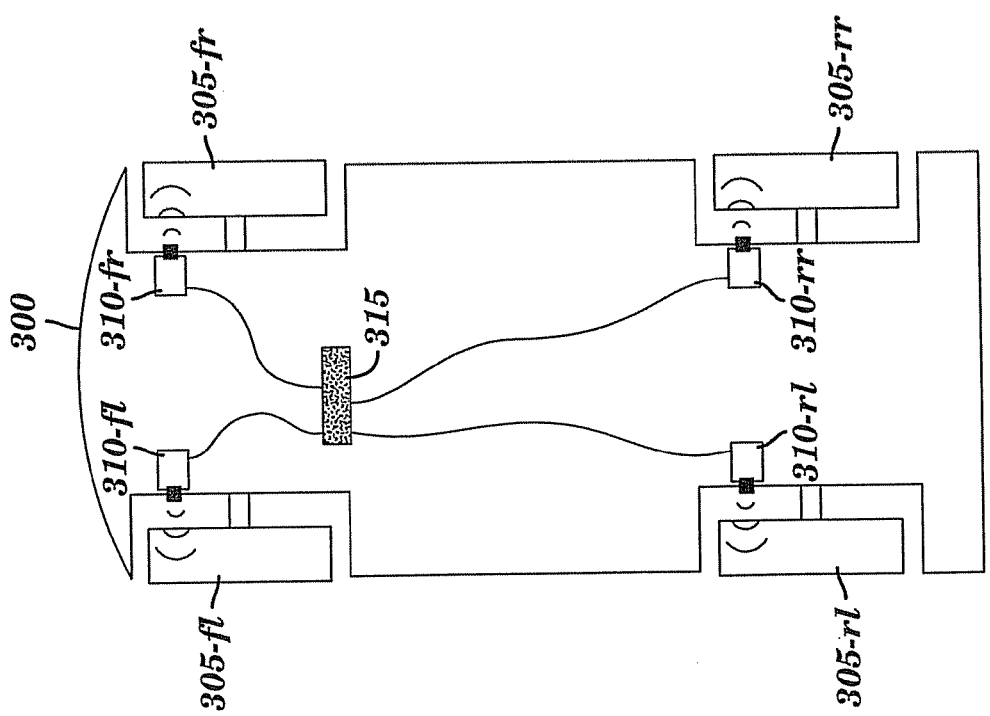

| 915 | 920 | 925 |
|---|---|---|
| 7 | 12 | 25 |
| 5 | 12 | 27 |
| ... | ... | ... |
| 13 | 127 | 125 | ← 910-i
| ... | ... | ... |
| 8 | 243 | 254 |

| 915 | 920 | 925 | 1200 | 1205 |
|---|---|---|---|---|
| 7 | 12 | 25 | 13/06/2004 | 24,271 |
| 5 | 12 | 27 | | |
| ... | ... | ... | | |
| 13 | 127 | 125 | 27/12/2003 | 12,345 |
| ... | ... | ... | | |
| 8 | 243 | 254 | | |

MONITORING OF WEARING SURFACE LAYER THICKNESS

This application is a continuation application claiming priority to Ser. No. 11/255,390, filed Oct. 20, 2005.

BACKGROUND OF THE INVENTION

1. Technical Field

The present invention relates to a method, system, and product for monitoring of wearing surface layer thickness.

2. Related Art

Because tires are the only points of contact between a vehicle and the road, tires are one of the most crucial safety components in the vehicle, for all types of vehicles, such as cars, trucks, sport utility vehicles, off-road vehicles, airplanes, motorcycles, bicycles, mobile industrial and construction equipment, and the like. Tires are responsible for how the vehicle responds to the driving and steering. To optimize the effects of the tires on the road and therefore, to provide a safety behavior of the vehicle, the inflation pressure of the tires must be kept within the range given by the manufacturer. Tires that are driven under-inflated generate excessively high heat levels that can weaken the tire to the point of failure. At high speed, a rapidly deflating tire can cause loss of vehicle control. An over-inflated tire will result in harsh ride quality and will cause uneven tire wear. Furthermore, operating a vehicle with over- or under-inflated tires increases both fuel consumption and the exhaust emissions produced by the vehicle.

Tires are designed to grip the road, allowing the vehicle to start, stop and go around corners safely in any weather. Proper treads allow for normal handling of a vehicle and help prevent skidding and hydroplaning. The treads that accomplishes this wear out over time. As a consequence, the distance that is required to stop a vehicle increase with the wear of tires. A recent series of tests conducted for The British Rubber Manufacturers Association by MIRA has shown that the stopping distance significantly increases and cornering performance deteriorates when tire tread depth falls below 3 mm, even if the legal minimum tread depth is 1.6 mm (generally, the tire tread depth is comprised between 7 and 9 mm). So, it is extremely important to check the tire treads for signs of wear.

Generally, tires are manufactured with a "wear bar" that tells when the remaining tread depth is less than the minimum legally required e.g., 1.6 mm. When this wear bar can be seen, the tire must be replaced. Other known marking devices disappear when the wear of the treads becomes critical. However, a main drawback of these systems is that wear of tires must be done wheel after wheel, when the vehicle is stopped, according to a manual or visual analysis that is often painful due to the location of the wheels in the vehicle wings.

In other known methods, acoustic wear indicators emit a sound signal by coming into contact with the ground when the tires reach a wear threshold level. An automatic monitoring is done by using a detector consisting of a microphone placed beneath the vehicle and a processing unit switches on an indicator placed in the instrument panel. If such solution allows an automatic control of the tire wear, it closely depends upon the vehicle environment and driving conditions and therefore, it could be complex to implement.

SUMMARY OF THE INVENTION

The present invention provides a product comprising a wearing surface layer and at least one Radio Frequency IDentification (RFID) tag within a thickness of the wearing surface layer, the wearing surface layer being an outermost surface layer of the product, the wearing surface layer adapted to be worn away such that a thickness of the wearing surface layer is reduced as the product is being used.

The present invention provides a method of wear level determination, comprising:

receiving data from at least one Radio Frequency IDentification (RFID) tag within a thickness of a wearing surface layer of each product of at least one product, the wearing surface layer of each product being an outermost surface layer of said each product, the wearing surface layer of said each product adapted to be worn away such that the thickness of the wearing surface layer is reduced as said each product is being used; and determining a measure of wear of the wearing surface layer of each product of the least one product from said received data.

The present invention remedies the shortcomings of the prior art described supra.

BRIEF DESCRIPTION OF THE DRAWINGS

FIG. 3, comprising FIG. 3a and FIG. 3b, shows schematically two examples of reader implementation within a car, in accordance with embodiments of the present invention.

FIG. 4, comprising

FIG. 9 is a table in which identifiers and spatial locations of RFIDs are stored, in accordance with embodiments of the present invention.

FIG. 12 depicts the table of FIG. 9 further comprising information relative to the date and mileage at which RFIDs have been extracted from the tire, in accordance with embodiments of the present invention.

DETAILED DESCRIPTION OF THE INVENTION

Figure 1A:
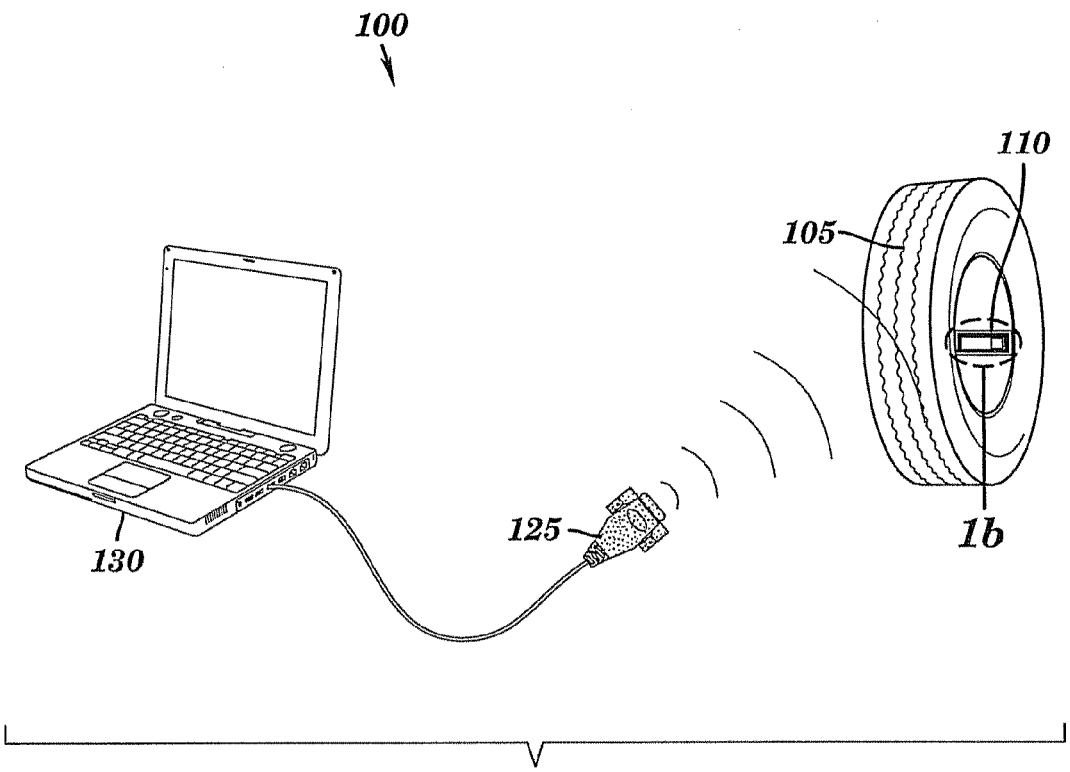
FIGS. 1 and 1B illustrate a Radio Frequency IDentification (RFID) system comprising a RFID tag and a reader, in accordance with embodiments of the present invention.

The present invention provides method and system for monitoring tire wear and tire wear balance. According to the present invention, Radio Frequency IDentifications (RFIDs) are embedded within the tire tread of the tire to monitor, at different distances from the periphery of the tire (i.e., at different depths within the thickness of the tread). As long as the tire wear increases, the thickness of the rubber decreases and RFIDs are removed. By monitoring the remaining RFIDs and analyzing their signatures, one can determine tire wear. Likewise, a plurality of RFIDs can be distributed along the tire width, at approximately equivalent distance from the tire periphery, to monitor tire wear balance.

The present invention provides a method and system for wireless wear monitoring of tire tread and other surfaces, the tires or surfaces being in movement or not.

The present invention provides a method and system for wireless wear monitoring of tire tread and other surfaces that is independent of the tire or surface environment.

The present invention provides a method and system for wireless wear monitoring of tire tread and other surfaces that do not required any learning phase.

The present invention provides a product having a wearing surface layer (e.g., tire tread of a tire, the tire adapted to be used in a vehicle) comprising at least one RFID tag characterizing a wear level of said wearing surface layer, said at least one RFID tag being embedded within the thickness of the wearing surface layer.

The wearing surface layer of the object is an outermost surface layer of the object. The thickness of the wearing surface layer (i.e., the thickness of the outermost surface layer) extends through the entire depth of the wearing surface layer and is oriented in a direction that is perpendicular to an exposed outermost surface of the surface layer of the object. The wearing surface layer has a characteristic of being worn away such that its thickness is reduced as the product is being used. As an example wherein the product is a tire, the wearing surface layer of the tire is the tire tread of the tire, and the thickness of the wearing surface layer of the tire is the thickness (i.e., the entire depth) of the tire tread of the tire. Thus, the thickness of the wearing surface layer is dynamically changing by being reduced as the product is being used.

In the description herein, such terms as "tire wear" and "wear level" of a tire are each a measure of a portion, fraction, percentage, etc. of the original tire tread that has been worn away since the tire tread was brand new. More generally, a measure of wear of a wearing surface layer is a measure of a portion, fraction, percentage, etc. of the original thickness of the wearing surface layer that has been worn away since the wearing surface layer was brand new.

The present invention provides a method for determining the wear level of a product comprising at least one wearing surface layer, wherein the said method comprises for each of said wearing surface layer: reading the data of the RFID tags embedded within said wearing surface layer; and determining the surface wear from said read data.

The present invention provides a method and system for monitoring wear of tire tread or other surfaces using embedded radio frequency transponders or Radio Frequency IDentification (RFID) tags, generically referred to as RFIDs in the description herein.

The core of any RFID system is the 'Tag' or 'Transponder', which can be attached to or embedded within objects, wherein data can be stored. An RFID reader, generically referred to as reader in the following description, sends out a radio frequency signal to the tag that broadcasts back its stored data to the reader. The system works basically as two separate antennas, one on the RFID and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID are currently available. For example, passive RFIDs do not require a battery for RF transmission since generally, the passive RFIDs are powered by the reader using an induction mechanism (an electromagnetic field is emitted by the reader antenna and received by an antenna located on the RFID). This power is used by the RFID to transmit a signal back to the reader, carrying the data stored in the RFID. Active RFIDs comprise a battery to transmit a signal to a reader. A signal is emitted at a predefined interval or transmit only when addressed by a reader.

When a passive RFID is to be read, the reader sends out a power pulse (e.g., a 134.2 KHz power pulse) to the RFID antenna. The magnetic field generated is 'collected' by the antenna in the RFID that is tuned to the same frequency. This received energy is rectified and stored on a small capacitor within the RFID. When the power pulse has finished, the RFID immediately transmits back its data, using the energy stored within its capacitor as its power source. Generally, 128 bits, including error detection information, are transmitted over a period of 20 ms. This data is picked up by the receiving antenna and decoded by the reader. Once all the data has been transmitted, the storage capacitor is discharged, resetting the RFID to make it ready for the next read cycle. The period between transmission pulses is known as the 'sync time' and lasts between 20 ms and 50 ms depending on the system setup. The transmission technique used between the RFID and the reader is Frequency Shift Keying (FSK) with transmissions generally comprised between 124.2 kHz and 134.2 kHz. This approach has comparatively good resistance to noise while also being very cost effective to implement. Many applications require RFID attached to objects be read while the vehicle is traveling (i.e., moving) at specific speeds by a readout antenna. With large antennas designed for Automatic Vehicle Identification (AVI), it is possible to read successfully data at read speeds of 65 m/s (i.e., 234 km/H).

RFIDs can be read-only, write-once, or read-write. A read-only RFID comprises a read-only memory that is loaded during manufacturing process. Its content can not be modified. The write-once RFIDs differ from the read-only RFIDs in that they can be programmed by the end-user, with the required data (e.g., part number or serial number). The read-write RFIDs allow for full read-write capability, allowing a user to update information stored in a tag as often as possible in the limit of the memory technology. Generally, the number of write cycles is limited to about 500,000 while the number of read cycles is not limited. A detail technical analysis of RFID is disclosed, e.g., in RFID (McGraw-Hill Networking Professional) by Steven Shepard, edition Hardcover.

Figure 1B:
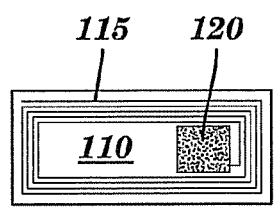

FIGS. 1a and 1b collectively illustrate a simple RFID system 100 comprising an object 105 on which a RFID 110 is glued. FIG. 1b is an expanded view of the RFID 110 of FIG. 1a. The RFID 110 comprises a support embedding an antenna 115 and an electronic circuit and memory 120. The data contained in the RFID 110 is read by a reader 125 connected to a computer 130. In other RFID systems, the RFID reader comprises all the required electronic components to work as a stand alone device In a first embodiment of the present invention, the tire tread or surface to monitor comprises at least one RFID corresponding to at least one wear threshold. The wear level is given by the presence or absence of this at least one RFID. If several RFIDs are embedded within the tire tread or surface to monitor, the data contained in each of them must be different so that the presence of each RFID can be detected.

Figure 2:
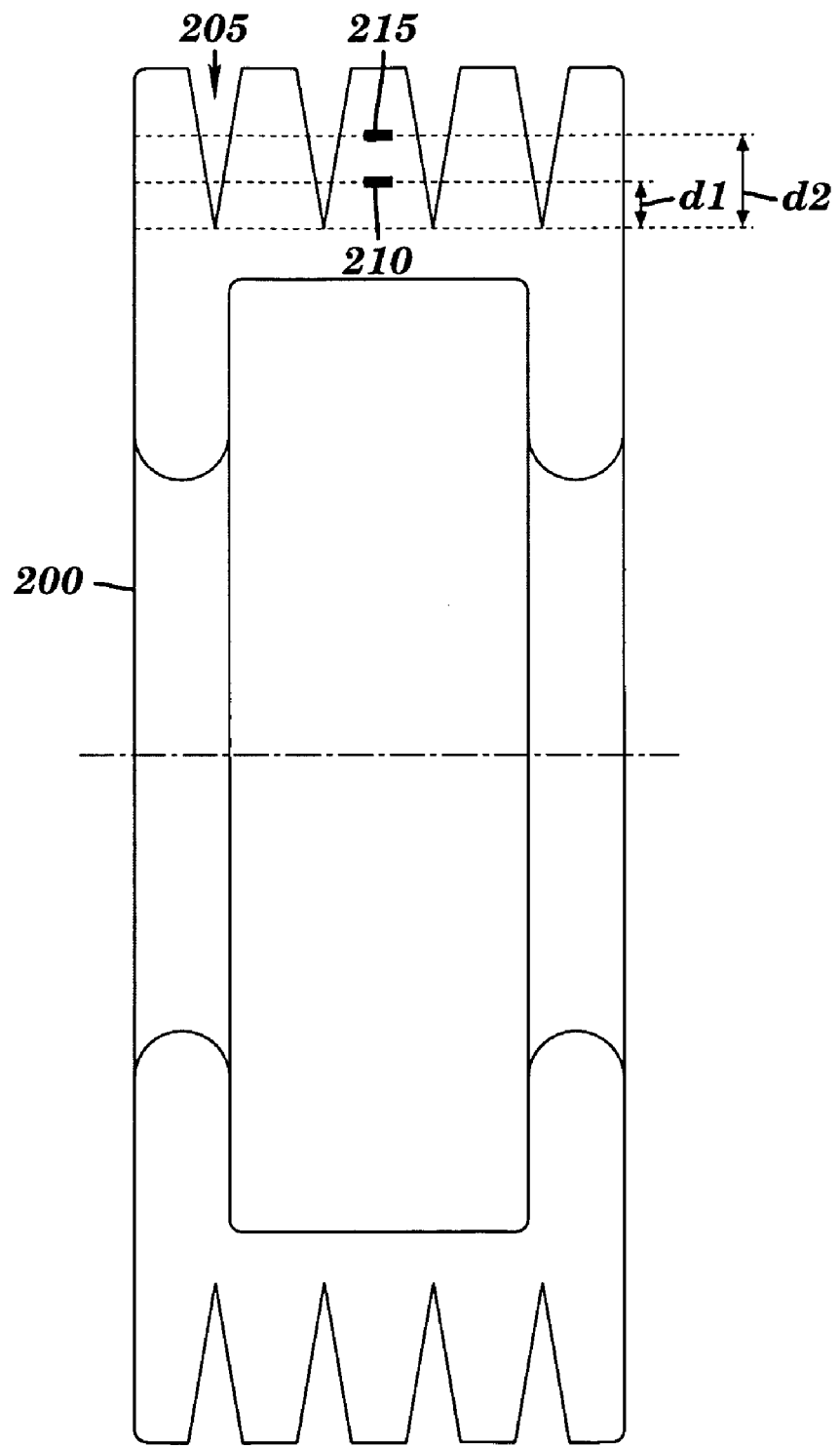
FIG. 2 depicts a cross section view of a tire embedding two RFIDs used to monitor the tire wear, in accordance with embodiments of the present invention.

FIG. 2 depicts a cross section view of an example of a tire 200 having grooves 205 designed in the tire tread. The tire 200 comprises a first RFID 210 located at a distance d1 from the bottom of the grooves and a second RFID 215 located at a distance d2 from the bottom of the grooves. In this example, the RFIDs are inserted within the rubber mix but it must be understood that RFIDs can also be positioned and glued within the grooves. For sake of illustration, d1 is equal to the minimum legal treads (i.e., 1.6 mm), and d2 is equal to 3 mm which corresponds to a main change of the tire behavior, as discussed above. When the tire is brand new and when a soft wear that does not affect the tire behavior appears, a reader can determine the presence of both RFIDs in the tire, using a known anti-collision algorithm. When a single RFID is detected in the tire, it means that the tire can still be used but its behavior has changed and so, uncertain behavior of the vehicle may occur. When no RFID is detected within a tire, the tire must be changed, since the legal wear threshold has been reached.

Inserting RFIDs within the tire rubber can be done during manufacturing of the tire. However, in an embodiment, the RFIDs are inserted later (i.e., after manufacturing of the tire), to avoid any manufacturing constraints such as high pressure and temperature, and to optimize RFID positioning accuracy. Therefore, inserting an RFID in less than few square millimeters or even less than one square millimeter within the tire rubber may use a needle that is inserted in the tire at the right depth within the thickness of the tire tread such that the RFID is left in place when the needle is removed.

To detect the presence and absence of RFIDs within tires, one or several readers can be used. The reader(s) can be installed within the vehicle, or in a mobile system that is moved near each tire to be tested, or in a fixed installation (e.g., in a garage). If a single reader is used to monitor several tires, the RFIDs embedded within these several tires must store different data so that each RFID can be uniquely identified.

The use of RFID technology presents several advantages. Firstly, the tire wear can be monitored: when the vehicle is moving or when it is stopped; when the tires are mounted on wheels or not; and when the wheels are mounted on the vehicle or not. Likewise, the tire wear can be monitored in most of environmental conditions such as weather conditions and electromagnetic conditions. Secondly, the monitoring system can be easily implemented on most of the vehicle and does not require any learning phase.

FIGS. 3a and 3b illustrate schematically the installation of reader(s) within a vehicle. FIG. 3a shows an example wherein a reader is assigned to each tire to monitor while FIG. 3b depicts another example wherein a single reader is used to monitor all the tires.

The vehicle 300 schematically shown on FIG. 3a comprises four tires referred to as 305-fl, 305-fr, 305-rl, and 305-rr (fl, fr, rl, and rr stand for front left, front right, rear left, and rear right, respectively). A reader is associated to each tire to monitor; i.e., reader 310-fl is associated to tire 305-fl, reader 310-fr is associated to tire 305-fr, reader 310-rl is associated to tire 305-rl, and reader 310-rr is associated to tire 305-rr. All the readers 310-fl, 310-fr, 310-rl, and 310-rr, being preferably directional readers, are connected to a central unit 315. Central unit 315 comprises the interface between the readers and the user; said interface may be a computer or a memory. In its simplest form, central unit 315 comprises a set of LEDs indicating the wear level of each tire. Central unit 315 may comprise an independent display or can be merged with the vehicle inboard computer. Thus in FIG. 3a, the vehicle 300 represents a structure that comprises the aforementioned four tires, associated RFIDs (305-fl, 305-fr, 305-rl, 305-rr) and readers (310-fl, 310-fr, 310-rl, 310-rr), and the central unit 315.

Since each reader is close to the tire that it monitors, the power of the reading signal can be set so as to activating only the RFIDs located in a close range (e.g., less than 0.5 m) avoiding ambiguity that could results from reading RFIDs of the other tires or any other RFIDs. Therefore, such solution avoids the need of identifying the tires to monitor.

FIG. 3b shows a second example of a vehicle 300', wherein a single reader 320 coupled to a central unit 325, namely an omni-directional reader, is used to monitor the wear of all of the four car tires. As shown, the RFIDs 305'-fl, 305'-fr, 305'-rl, and 305'-rr in FIG. 3b are respectively analogous to the RFIDs 305-fl, 305-fr, 305-rl, and 305-rr of FIG. 3a. To avoid any ambiguity the RFIDs of each tire must be identified. This can be done by assigning a unique identification number to each tire, the identification number being stored in each RFID memory so that comparing the values stored in two RFIDs allows a determination of whether or not these RFIDs belong to a same tire. Thus in FIG. 3b, the vehicle 300' represents a structure that comprises the aforementioned four tires, associated RFIDs (305'-fl, 305'-fr, 305'-rl, 305'-rr), the reader 320, and the central unit 325.

Figure 4A:
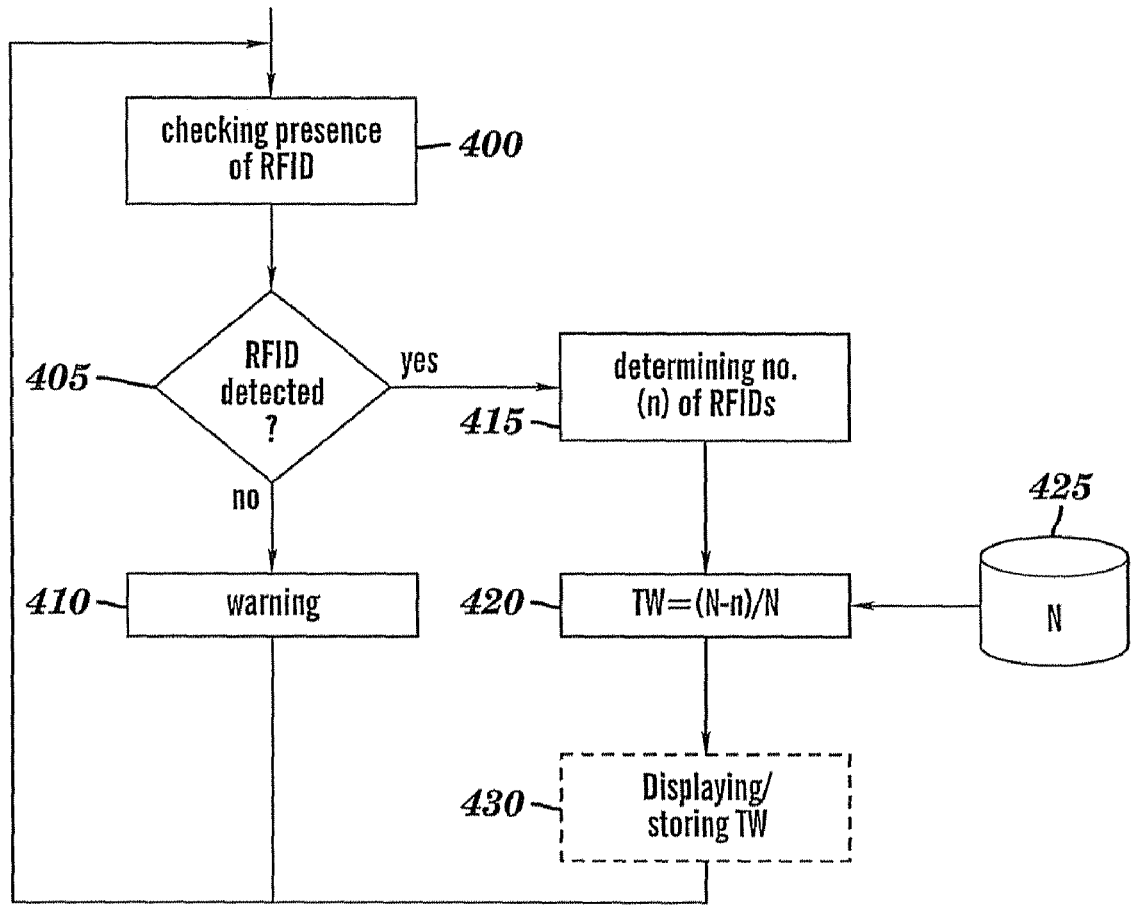
FIGS. 4a and 4b, illustrates examples of algorithms that could be used in conjunction with readers for determining tire wear, in accordance with embodiments of the present invention.
Figure 4B:
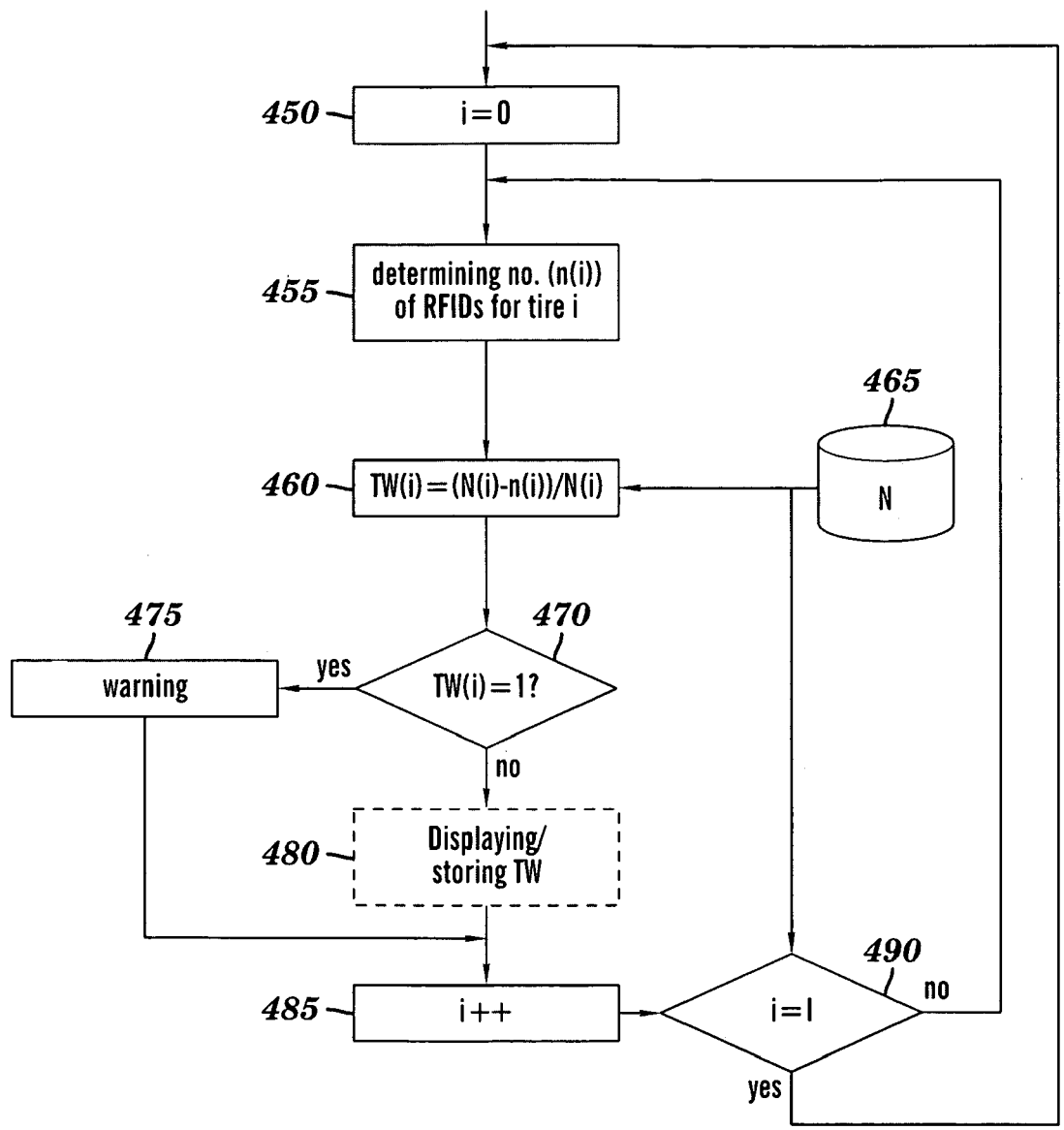

An algorithm used to determine the wear level of the tires is shown in FIGS. 4a and 4b. FIG. 4a illustrates the algorithm associated to the readers when each tire is monitored by an independent reader, while FIG. 4b shows a similar algorithm when a single reader is used to monitor several tires.

After having emitted a reading signal, the reader checks the presence of RFIDs (steps 400 and 405). If no RFID is detected, a warning signal is transmitted to the user to indicate an absence of the tire or to indicate that the tire must be replaced as soon as possible since the wear limit has been reached (step 410). The warning signal can take several forms (e.g., sound, color LED). If at least one RFID is detected, the reader, or its associated computing unit, determines the number n of RFIDs detected using a standard anti-collision algorithm (step 415). Then, the tire wear TW is determined by comparing the number n of RFIDs still embedded within the tire with the number N of RFIDs that were embedded in the tire when the tire was brand new (step 420). For example, a measure of wear of the tire tread is the tire wear TW which can be estimated in accordance with Equation (1).

$$TW=(N-n)/N \qquad (1)$$

The number N may be stored, for example, in the reader memory 425. The tire wear may be displayed on a standard display or by means of LEDs, may be stored for further use, or may be used for processing (step 430).

If a single reader is used to monitor several tires, each tire can be checked sequentially as illustrated in the algorithm depicted on FIG. 4b. An index i, representing a tire i, is set to zero (step 450) and the number n(i) of RFIDs still embedded within tire having index i is determined (step 455). As mentioned supra, several solutions exist to do such determination, the simplest one being to assign a unique identifier to each tire, this unique identifier being copied in each RFID embedded within the corresponding tire. For example, a tire having identifier '12345' can comprise 3 RFIDs storing data '12345 0', '12345 1', and '12345 2', respectively. Then, the tire wear TW(i), corresponding to tire having index i, is computed (step 460) by comparing the number n(i) of RFIDs still embedded in tire having index i with the number N(i) of RFIDs that were embedded in the tire having index i when it was brand new. For sake of illustration, a measure of wear of the tire tread of the tire I is the tire wear the tire wear TW(i) which can be estimated in accordance with Equation (2):

$$TW(i)=(N(i)-n(i))/N(i) \qquad (2)$$

The value N(i) can be stored in the reader memory 465. If the tire wear is equal to one (step 470), then the tire having index i does not comprise any more RFIDs and so must be changed as soon as possible. In such case, a warning may be transmitted to the user by any means of (e.g., light or sound). If the tire wear TW(i) differs from one, then TW(i) is displayed on a standard display or by means of LEDs, is stored for further use, or is used for processing (step 480). Then, the index i is incremented by one (step 485) and a test is performed (step 490) to determine whether or not the value of the index i is equal to a value I representing the number of tires to monitor. Value I can also be stored in the reader memory 465. If the value of index i equals I and therefore does not correspond to a tire, then i is reset to zero (step 450) and the first tire is checked again (steps 455 to 490). Else in step 490, if the value of index i is less than I (corresponding to a tire), then the tire having the index i is checked (steps 455 to 490).

Alternatively, the data contains in the RFIDs provides an indication of the tire wear. For example, such data can be a wear percentage value, a value representing the distance between the RFID and the bottom of the grooves, a value representing the distance between the RFID and the of the tire periphery (i.e., exterior surface of the tire tread) when the tire was brand new, etc. For example, considering the tire illustrated on FIG. 2, the RFID 210 can contain the data '100%' (or '1.6 mm') while RFID 215 contains the data '66%' (or '3 mm'). These values may be encoded using standard encoding methods. For example, if tire tread thickness Td is between 1.6 mm and 9 mm and if tire wear data Wd stored in the RFID is coded in one byte (i.e., Wd is between 0 and 255), then the values are converted to a measure of wear Wd in accordance with Equation (3):

$$Wd=255\times(Td-1.6)/(9-1.6) \qquad (3)$$

In such case, the tire wear is determined by selecting the smaller wear percentage value, or the greater tire grooves depth value, among all the values extracted from data read in the detected RFIDs. As described above, the data can also comprise a tire identifier that can be used when a single reader monitors several tires. Therefore, considering the previous example, one can conclude that tire wear is less than 66% or that tire tread thickness is at least equal to 3 mm when reading the data from RFIDs 210 and 215.

Figure 5A:
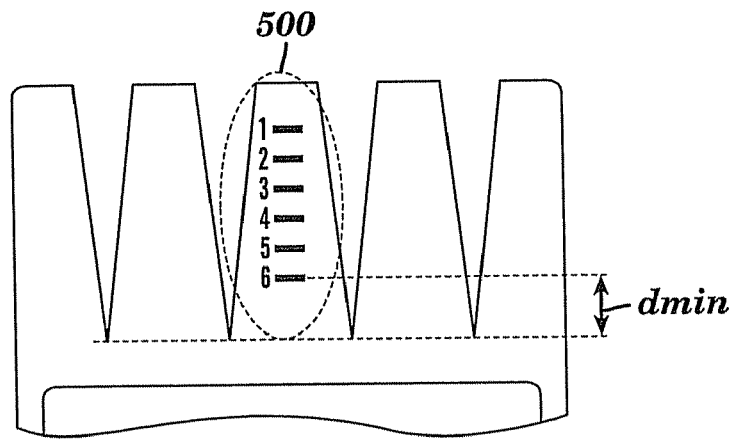
FIG. 5, comprising FIGS. 5a, 5b, and 5c, showing partial cross section views of a tire, depicts examples of the implementation of RFIDs in a tire, as well as the data stored in these RFIDs, in accordance with embodiments of the present invention.
Figure 5B:
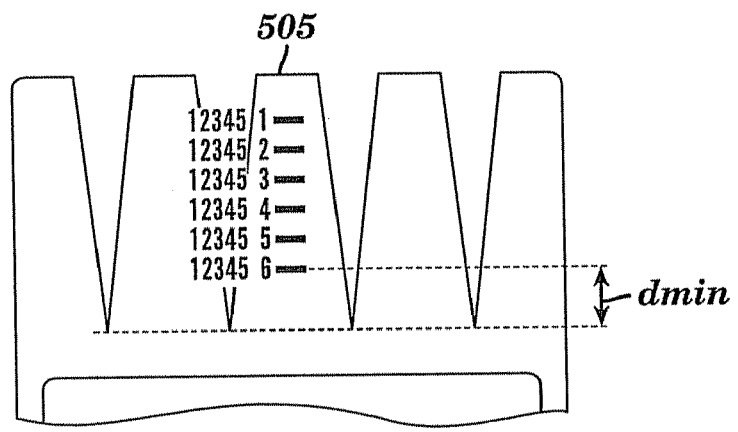

In a second embodiment of the present invention, each tire comprises a set of RFIDs, embedded in the tire at different distances from the periphery of the tire (i.e., at different depths within the thickness of the tread or, equivalently, at different distances from the exterior surface of the tire tread), which may be according to a linear (i.e., spatially uniform) distribution, and storing data comprising ordered and continuous values of 1, 2, . . . , 6 corresponding to the rank of the RFID when the tire is brand new. The minimal value (e.g., one), is set close to the periphery while the greater value is positioned at the greater distance from the periphery. FIG. 5a and FIG. 5b show two examples of a partial cross section view of a tire embedding RFIDs according to the second embodiment. According to the example illustrated in FIG. 5a, one reader is used per tire since the data, or rank, stored in the set 500 of RFIDs of two different tires can be the same. Using tires as the one partially shown on FIG. 5b, a single reader can be used to monitor several tires since the data stored in each RFID of the set 505 contains a first value representing the tire identifier and a second value representing the RFID. In the example of FIG. 5b, the first value is the tire identifier '12345' while the second value is varies from 1 to 6. The extraction of the tire identifier and the RFID identifier from the data can be performed using a fixed size format; e.g., 5 bytes for the tire identifier and 1 byte for the RFID identifier, or using predetermined delimiter (i.e., a special character).

For the example of FIG. 5a and considering that at time t, only RFIDs storing values 5 and 6 are detected, it is determined that the tire wear is between 50% and 66%. Detecting values 5 and 6 means that when the tire was brand new, the tire was embedding 6 RFIDs. Using Equation (1), since 2 RFIDs are still embedded within the tire, the tire wear TW(t) is less than (6−2)/6 (i.e., 66%), and at a time x before the last RFID was lost the tire was embedding 3 RFIDs corresponding to a tire wear TW(t−x) that was less than (6−3)/6 (i.e., 50%). Therefore, the actual tire wear is between 50% and 66%.

The algorithms presented on FIGS. 4a and 4b, described supra, are also valid for this second embodiment. However, the values N and N(i) are not stored in the reader memory but are directly determined from the values stored in the detected RFIDs. Considering that values stored in the RFIDs are expressed as V(j), where j is an index corresponding to the rank of the RFIDs within a tire. Then, $$N=\max_j(V(j)) \qquad (4)$$

Likewise, considering that values stored in the RFIDs are expressed as V(i,j), where i is the index corresponding to the tire i, and j is the index corresponding to the rank of the RFIDs within the tire then, $$N(i)=\max_j(V(i,j)) \qquad (5)$$

Figure 5C:
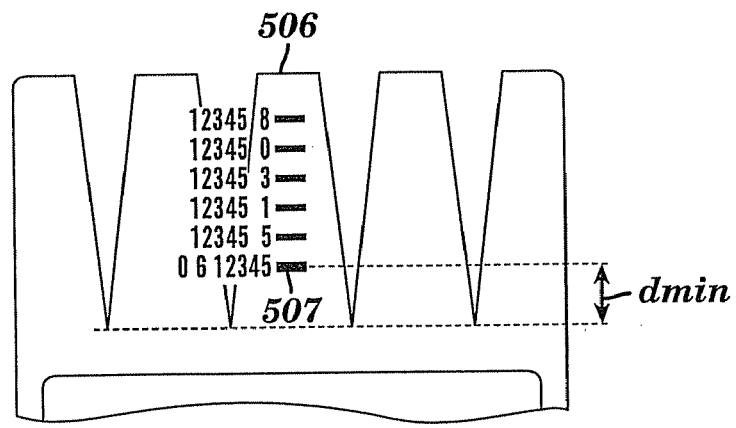

In a third embodiment of the present invention, a particular RFID (e.g., the RFID that is located at the greatest distance from the periphery of the tire; i.e., the maximum distance from the exterior surface of the tire tread) is used to store additional information. Firstly, this additional information is the number of RFIDs that were embedded within the tire when it was brand new. In such case, it is not necessary to store the number of RFIDs in the reader memory as mentioned in the first embodiment, nor to store particular values in the RFIDs as disclosed in the second embodiment. In the third embodiment, the algorithms presented on FIGS. 4a and 4b are still valid. However, the values N and N(i) are directly read from this particular RFID that can be easily identified by using a dedicated identifier as illustrated on FIG. 5c. In the example of FIG. 5c, the identifier to determine the particular RFID 507 of the set 506 is the value zero (i.e., 0) at followed by the number of RFIDs (i.e., 6) that were embedded in the tire when the tire was brand new. The last part of the data in the particular RFID 507 can be used to store other information such as tire identifier, as depicted.

Figure 6:
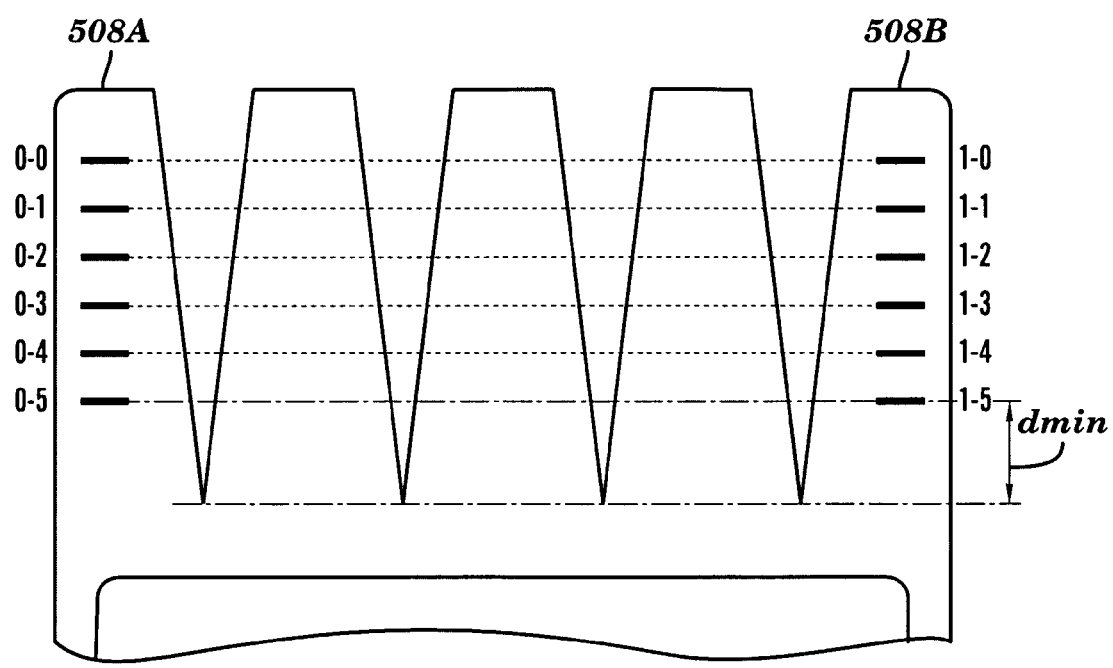
FIG. 6, showing a partial cross section view of a tire, illustrates an example of the implementation of RFIDs in a tire that allows the monitoring of tire wear and of tire wear balance, in accordance with embodiments of the present invention.

In a fourth embodiment of the present invention, several RFIDs are distributed along the tire width, at approximately the same distance from the tire periphery, so as to control wear balance along the tire width. The tire width is oriented perpendicular to the tire thickness and perpendicular to the opposite sides of the tire. FIG. 6 shows an example of such a distribution of RFIDs along the tire width. As illustrated, a first set 508A of RFIDs (0-0 to 0-5) is embedded within the rubber in the tire left part and a second set 508B of RFIDs (1-0 to 1-5) is embedded within the rubber of the tire right part. By counting and comparing the number of RFIDs embedded within each set of the tire, one can determine if the tire wear is normal or abnormal (i.e., one can analyze tire wear balance along the tire width). For example, if the number of RFIDs belonging to each set is the same for all the sets or if there is only a difference of one RFID, one can conclude that the tire wear is a normal wear (i.e., the tire wear is balanced along the tire width), whereas a difference of two or more RFIDs means that the tire wear is an abnormal wear (i.e., the tire wear is unbalanced along the tire width). The greater the difference between the number of RFIDs embedded within each set, the greater the tire wear unbalance is.

In the example given on FIG. 6, the tire comprises only two sets of RFIDs but it must be understood that the tire can comprises more sets than two. For example, another set of RFIDs can be implemented in the middle of the tire. Using several sets of RFIDs disposed along the tire width a tire wear profile along the tire width to be determined.

Figure 7:
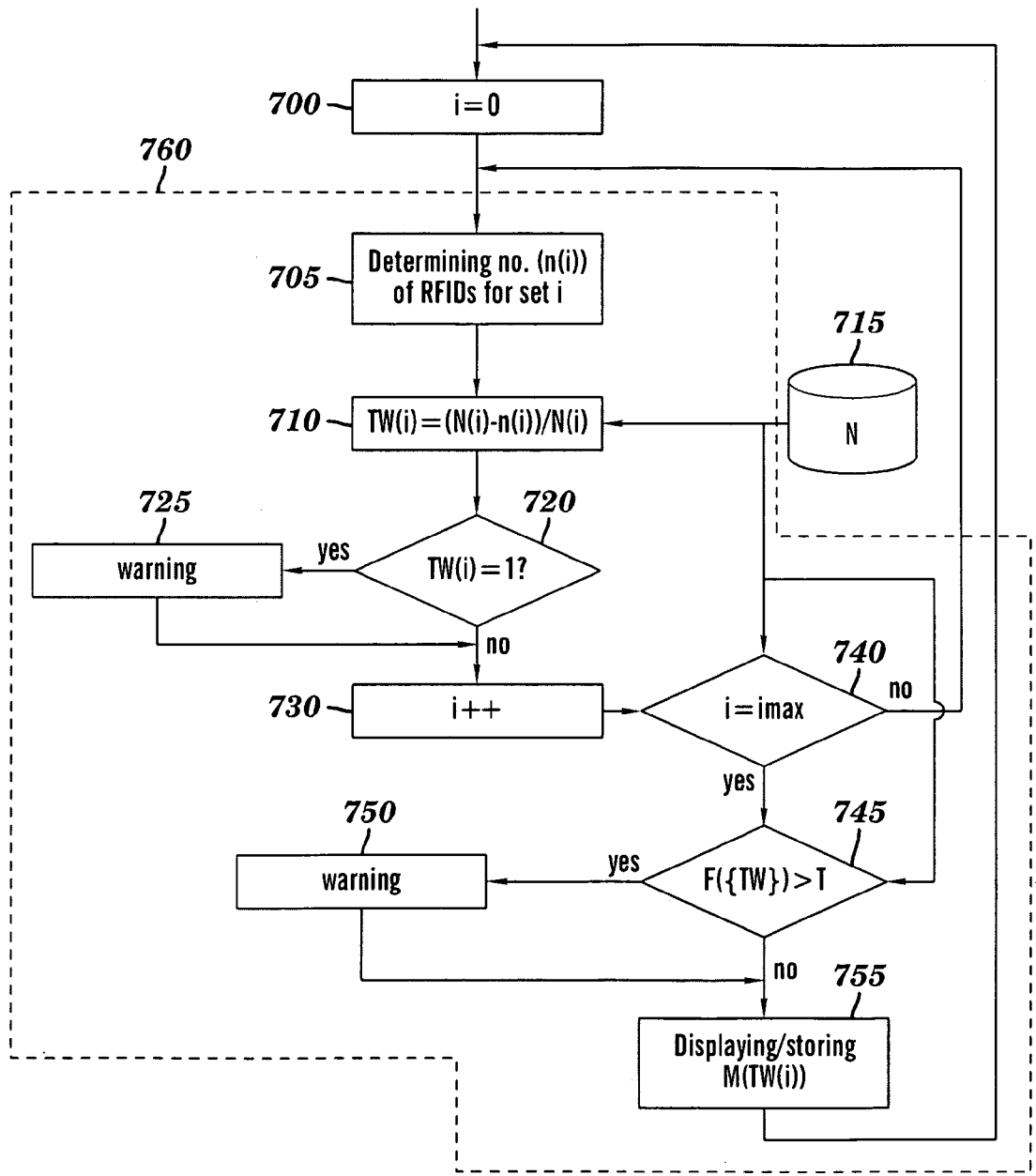
FIG. 7 shows an example of an algorithm for monitoring tire wear balance, in accordance with embodiments of the present invention.

FIG. 7 illustrates an example of an algorithm that can be used in conjunction with a reader that monitors a single wear to detect tire wear and tire wear balance along the tire width. Firstly, an index i, identifying a set of RFIDs in the tire to monitor, is set to zero (step 700) and the number of RFIDs embedded within set i in the tire is determined (step 705). Determining the number of RFIDs belonging to one set in a tire comprises analyzing the data stored in the read RFIDs. For example, consider data that comprises two parts delimited by a special character, or having a predetermined coding, the first part being used to identify the tire set while the second part is an RFID identifier. In the example shown on FIG. 6, the special character is '-'. Using the number N(i) of RFIDs that were embedded within RFID set i in the tire when the tire was brand new, the tire wear TW(i) of the tire corresponding to RFID set i can be determined (step 710). As mentioned supra, number N(i) can be stored in the reader memory 715 or in a particular RFID. If the tire wear TW(i) is equal to 1 (step 720), which means that RFID tire set i has tire wear at 100%, a warning is transmitted to the user (step 725). Then, index i is incremented by one (step 730) and a second test is performed (step 740) to determine whether or not index i is equal to the number imax of sets of RFIDs in the tire. If i is equal to imax, then the tire wear has been evaluated for each monitored RFID set in the tire. The number imax can be stored in the reader memory 715. If I is unequal to imax, then the tire wear has not been evaluated for each RFID tire set, and steps 705 to 740 are repeated to evaluate tire wear in the remaining RFID tire sets i, i+1, . . . , imax−1.

Let {TW} denote TW(0), . . . , TW(imax−1). Thus {TW} represents a set of tire wear for the imax RFID sets in the tire. If the tire wear TW(i) has been evaluated for each RFID tire set i (i=0, 1, . . . , imax−1)), a further test is performed in step 745 to determine if the maximum tire wear difference F({TW}) among the imax RFID tire sets is greater than a predetermined threshold T; i.e., if F({TW})>T. The tire wear difference F({TW}) is a measure of the tire wear balance along the tire width. If F({TW})>T, then a warning is transmitted to the user (step 750). The threshold T can be stored, for example, in the reader memory 715, as discussed supra. The function F({TW}) may be represented, for example, according to Equation (6):

$$F(\{TW\})=\max_{j,k}(abs(TW(j)-TW(k))) \quad (6)$$

corresponding to the maximum difference in tire wear between two RFID sets of the imax RFID sets in the tire, wherein said two RFID sets are identified by the indexes j and k in Equation (6).

The mean tire wear of {TW} is computed according to the function M({TW}) that is either displayed, used for processing, or stored for future processing (step 755), and the monitoring cycle is repeated beginning at step 700, as shown. The function M({TW}) may be represented, for example, according to Equation (7):

$$M(\{TW\})=\Sigma_i(TW(i))/imax \quad (7)$$

Figure 8:
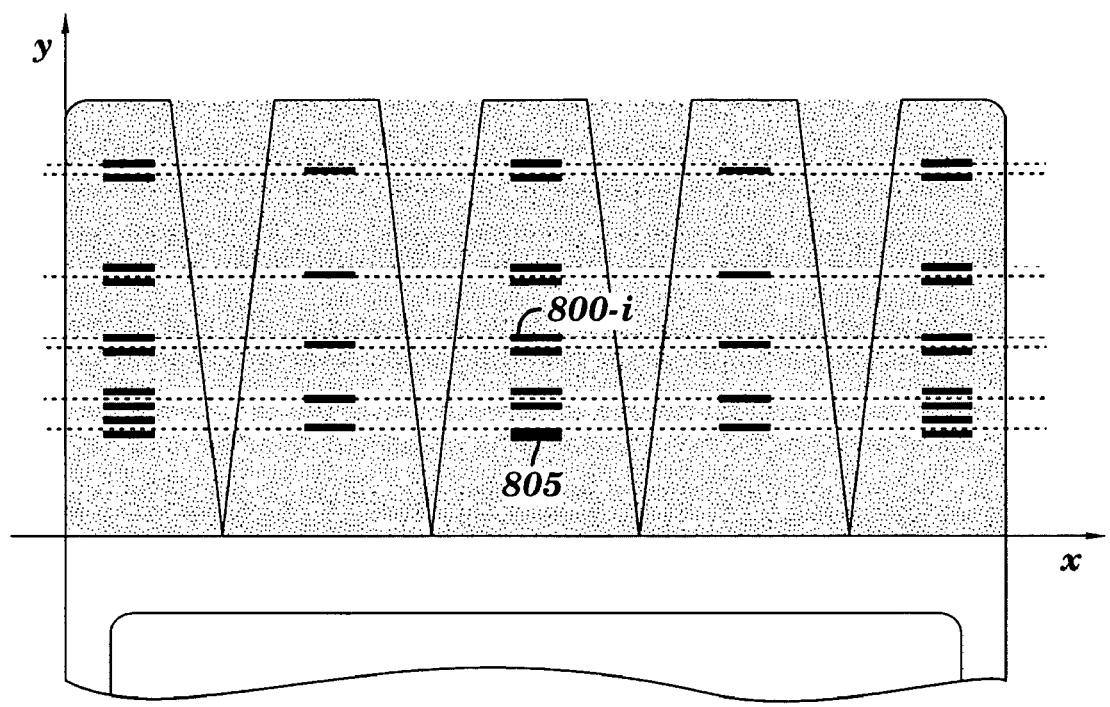
FIG. 8 illustrates a partial cross section view of a tire embedding RFIDs that one stores the spacial locations of these RFIDs, in accordance with embodiments of the present invention.

In a fifth embodiment of the present invention, a particular RFID that is analogous to the particular RFID 507 in FIG. 5c in relation to the third embodiment, can be used to store a spatial description of the RFIDs within each tire, to determine their relative position according to the rotation axle and the radius of the tire. FIG. 8 depicts a partial cross section view of a tire embedding RFIDs 800-i and a special RFID 805. The special RFID 805 of the fifth embodiment is analogous to the particular RFID of the third embodiment (e.g., the particular RFID 507 in FIG. 5c). Reference axis determining X and Y directions corresponding to the rotation axle and the radius of the tire, respectively, are depicted in FIG. 8. The origin of the reference axis may be chosen so that the X axis is positioned at the bottom of the tire grooves and the Y axis is positioned on a tire side, as depicted. Still in an embodiment, coordinates are encoded on two fixed sized numbers, for example two bytes, one for the abscissa X and one for the ordinate Y, in such a way that the tire width is equal to the maximum value that an abscissa X can reach and the tread thickness is equal to the maximum value that an ordinate Y can reach. Using such system, the positions of each RFID can be expressed as coordinates (i.e., couples of values (X,Y)).

Table 900, depicted on FIG. 9, illustrates an example of the content of the special RFID 805 of FIG. 8. Table 900 of FIG. 9 comprises a first cell 905 wherein the identifier of the tire ('12345') can be stored, and as many rows as RFIDs embedded within the tires. Each row, generically referred to as row 910, is divided in three columns. The first column 915 is used to store the RFID's identifiers, the second column 920 and the third column 925 are used to store the RFID's X and Y coordinates, respectively. For example, row 910-i contains the coordinates (127,125) of the RFID having 13 as identifier. It should be noticed that tire identifier is not required, particularly if an independent reader is assigned to each tire to monitor. Likewise, if the identifiers of the RFIDs correspond to continuous values starting from a predefined value (e.g., 0, 1, 2, . . . ), the values stored in column 915 are not required. In an embodiment, the special RFID has a particular identifier, such as 255 if RFID's identifiers are coded on one byte. This special RFID may also contain other information such as the optimum set width; i.e., the maximum abscissa difference of two RFIDs belonging to a same set.

Figure 10:
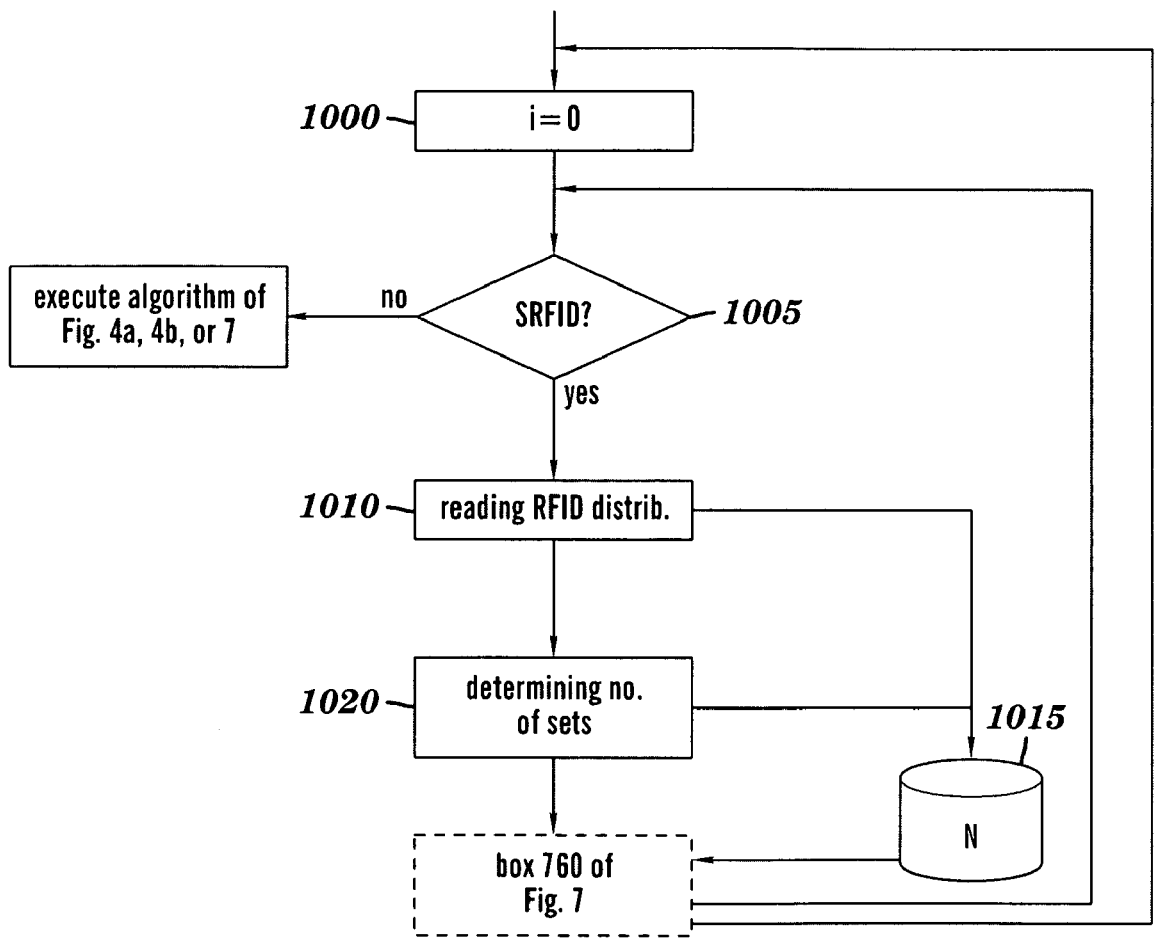
FIG. 10 shows an example of an algorithm used to monitor wear of tire embedding RFIDs that at least one comprises spatial locations of these RFIDs, in accordance with embodiments of the present invention.

FIG. 10 shows an example of the algorithm that could be used in order to monitor a tire having RFIDs embedded according to the fifth embodiment. A first step resets to zero (step 1000) an index i, identifying a set of RFIDs having approximately equal abscissas X. Then, a first test is performed to determine whether or not the monitored tire comprises a special RFID (SRFID) (step 1005). This test can, for example, determine if the identifier of an RFID corresponds to the identifier assigned to special RFIDs. If no special RFID is found, the algorithm uses one of the previous described algorithms (FIG. 4a, 4b or 7) to monitor the tire. If the tire comprises a special RFID, the content of this special RFID is read (step 1010) and stored in the reader memory 1015, or in the memory of the processing device, and the number of sets of RFIDs having approximately equal abscissas is determined (1020). Then, all the steps mentioned in box 760 of FIG. 7 (steps 705 to 755) are performed.

Figure 11:
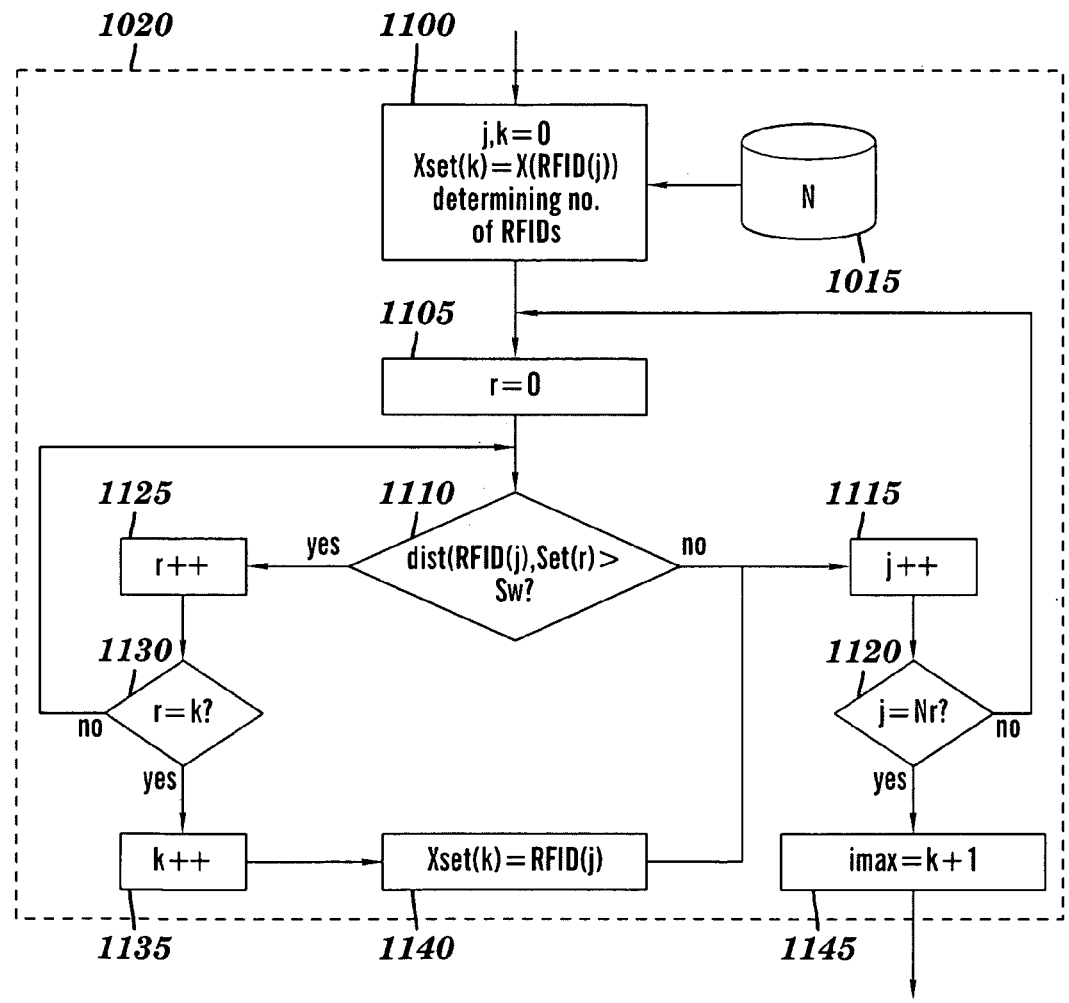
FIG. 11 illustrates an example of an algorithm allowing the determination of the number of sets of RFIDs in a tire for monitoring tire wear balance, in accordance with embodiments of the present invention.

A method to determine the number of sets of RFIDs having approximately equal abscissas is illustrated on the algorithm depicted of FIG. 11. The first step initializes index j and variable k to zero. Index j corresponds to the current selected RFID, and variable k is such that (k+1) corresponds to the number of RFID sets, in storing abscissa of RFID(j), referred to as X(RFID(j)), in variable Xset(k), and in determining the number Nr of RFIDs embedded within the tire (step 1100). Then index r, identifying the current selected RFID set, is initialized to zero (step 1105). A first test is done to determine whether or not the distance (distx) between the abscissa of the current selected RFID (RFID(j)) and the abscissa Xset(r) associated to the current selected set is greater than a predetermined threshold Sw (step 1110). Threshold Sw may be stored in reader memory wherein Sw may have been copied from the special RFID. If the distance between the abscissa of the current selected RFID (RFID(j)) and the abscissa Xset(r) associated to the current selected set is less than threshold Sw, index j is incremented by one (step 1115), and another test is done to determine whether or not index j is equal to the number Nr of RFIDs embedded within the tire (step 1120). If index j is not equal to the number Nr, the last four steps (steps 1105 to 1120) are repeated. If the distance between the abscissa of the current selected RFID (RFID(j)) and the abscissa Xset(r) associated to the current selected set is greater than threshold Sw, index r is incremented by one (step 1125), and another test is done to determine whether or not index r is equal to the variable k (step 1130). If index r is not equal to the variable k, the last three steps (steps 1110 to 1130) are repeated. If index r is equal to the variable k, the variable k is incremented by one (step 1135), the abscissa of RFID(j), referred to as X(RFID(j)), is stored in variable Xset(k) (step 1140), and the algorithm is branched to step 1115. If index j is equal to the number Nr, the variable imax, corresponding to the number of sets of RFIDs, is set to the value (k+1) (step 1145). The variable imax is preferably stored in reader memory 1015.

The functions used to determine the tire wear and the tire wear balance may be adapted to the spatial distribution of the RFIDs. For example, care should be taken if the distribution of the RFIDs along the Y axis is nonlinear (i.e., not spatially uniform), as shown on FIG. 8. In such case, considering a set i of RFIDs, the ordinates of which being expressed as Y(RFIDs(i)), the following function for determining the measure of wear TW(i) in Equation (8) can be used:

$$TW(i) = (YN\max(RFID(i)) - Y\max(RFID(i)))/YN\max(RFID(i)) \quad (8)$$

wherein YNmax(RFID(i)) represents the maximum ordinate of the RFIDs of set i when considering all the RFIDs of this set; i.e., the RFIDs of set i embedded within the tire when it was brand new. Ymax(RFID(i)) represents the maximum ordinate of the RFIDs of set i when considering the RFIDs of this set at a given time.

In a sixth embodiment, one of the embedded RFIDs, such as the special RFID, comprises a read-write RFID, the writable memory of this RFID being used to store the history of the tire wear i.e., the time and/or mileage at which each, or some, RFID has(have) been detached from the tire. Such feature allows, in particular, optimization of the tire management of a fleet of vehicles. FIG. 12 illustrates Table 900', representing a modification of table 900 of FIG. 9 with two additional columns 1200 and 1205 for storing date and mileage, respectively. For example, from table 900', it can be easily determined that RFID having identifier 13, positioned at coordinates (127,125), has been lost on Dec. 27, 2003, at mileage 12,345. Table 900' is updated when monitoring the tire. Each time an event is detected (i.e., the number of RFIDs changes), the system determines which RFIDs have been extracted (i.e., detached) from a tire, determines a date (called a "detach date") and/or mileage from the vehicle computer or similar electronic devices storing such information, and writes this data in the corresponding cells of Table 900' (i.e., in columns 1200 and/or 1205 of the rows corresponding to undetected RFIDs). Naturally, only column 1200 or column 1205 can be used.

In a further embodiment, the writable part of the RFID is used to record all the events concerning the tire such as pressure variation or change of wheel position, using the same mechanism as described above. Each time a new event is detected, the new event is written in the RFID for further processing.

In order to satisfy local and specific requirements, a person skilled in the art may apply to the solution described above many modifications and alterations, all of which are included within the scope the present invention.

What is claimed is:

1. A method of wear level determination, comprising:
   distributing multiple Radio Frequency IDentification (RFID) tags within a thickness of a wearing surface layer of a tire at an X coordinate and a Y coordinate, said X coordinate being a coordinate along a rotation axis of the tire, said Y coordinate being a coordinate along a radius of the tire, said wearing surface layer of the tire being an outermost surface layer of the tire, said multiple RFID tags and said wearing surface layer adapted to be worn away as the tire is being used such that the thickness of the wearing surface layer is reduced as the tire is being used, said multiple RFID tags consisting of a first plurality of RFID tags that have not been worn away, a second plurality of RFID tags that have been worn away, and a special RFID tag that has not been worn away;
   after said distributing and after the tire has been mounted on a vehicle and after the second plurality of tags has been worn away and while the first plurality of tags has not been worn away and while the special RFID tag has not been worn away, receiving data from the first plurality of RFID tags and from a table in the special RFID tag; and
   determining a measure of wear of the wearing surface layer of the tire from said received data,
   wherein the table in the special RFID tag comprises: an identifier of each RFID tag of the first plurality of RFID tags, the X coordinate and the Y coordinate of each RFID tag of the first plurality of RFID tags, an identifier of each RFID tag of the second plurality of RFID tags, and the X coordinate and the Y coordinate at which each RFID tag of the second plurality of RFID tags had been disposed in the wearing surface layer before being worn away.

2. The method of claim 1, wherein the table in the special RFID tag further comprises an identifier of the tire.

3. The method of claim 1, wherein the table in the special RFID tag further comprises a date and milage of the vehicle at which each RFID tag of the second plurality of RFID tags had been worn away.

4. The method of claim 1,
   wherein the table in the special RFID tag comprises a first plurality of rows and a second plurality of rows;

wherein each row of the first plurality of rows corresponds to a RFID tag of the first plurality of RFID tags and comprises an identifier of its corresponding RFID tag and both the X coordinate and the Y coordinate of its corresponding RFID tag; and wherein each row of the second plurality of rows is associated with a RFID tag of the second plurality of RFID tags and comprises an identifier of its associated RFID tag, the X coordinate and the Y coordinate at which its associated RFID tag had been disposed in the wearing surface layer before being worn away.

5. The method of claim 1, wherein said determining the measure of wear comprises:

classifying, from the received data, the RFIDs of the first and second plurality of RFID tags into N sets of RFIDs such that N is at least 2; and for set i of the N sets (i=1, 2, ..., N), computing a measure of wear TW(i).

6. The method of claim 5, wherein each set of the N sets is characterized by the X coordinate of all RFIDs in each set not deviating from each other by more than a predetermined threshold Sw, and wherein the special RFID tag stores an optimum maximum deviation among the X coordinates of all RFIDs in any same set of the N sets.

7. The method of claim 6, wherein said computing TW(i) comprises computing TW(i) via TW(i)=(YNmax(RFID(i))−Ymax(RFID(i)))/YNmax(RFID(i)), wherein YNmax(RFID(i)) is a maximum Y coordinate of all RFIDs in set i, and wherein Ymax(RFID(i)) is a maximum Y coordinate of the RFIDs in set i that are comprised by the first plurality of RFID tags.

8. A product, comprising:

a wearing surface layer of a tire;

multiple Radio Frequency IDentification (RFID) tags within a thickness of the wearing surface layer at an X coordinate and a Y coordinate, said X coordinate being a coordinate along a rotation axis of the tire, said Y coordinate being a coordinate along a radius of the tire, said wearing surface layer of the tire being an outermost surface layer of the tire, said multiple RFID tags and said wearing surface layer adapted to be worn away as the tire is being used such that the thickness of the wearing surface layer is reduced as the tire is being used, said multiple RFID tags consisting of a first plurality of RFID tags that have not been worn away and a special RFID tag that has not been worn away; and means for determining a measure of wear of the wearing surface layer of the tire from data received from the first plurality of RFID tags and from a table in the special RFID tag, wherein the table in the special RFID tag comprises: an identifier of each RFID tag of the first plurality of RFID tags, the X coordinate and the Y coordinate of each RFID tag of the first plurality of RFID tags, an identifier of each RFID tag of a second plurality of RFID tags that had previously been disposed in the wearing surface layer and have been worn away, and the X coordinate and the Y coordinate at which each RFID tag of the second plurality of RFID tags had been disposed in the wearing surface layer before being worn away.

9. The product of claim 8, wherein the table in the special RFID tag further comprises an identifier of the tire.

10. The product of claim 8, wherein the table in the special RFID tag further comprises a date and milage of the vehicle at which each RFID tag of the second plurality of RFID tags had been worn away.

11. The product of claim 8, wherein the table in the special RFID tag comprises a first plurality of rows and a second plurality of rows;

wherein each row of the first plurality of rows corresponds to a RFID tag of the first plurality of RFID tags and comprises an identifier of its corresponding RFID tag and both the X coordinate and the Y coordinate of its corresponding RFID tag;

wherein each row of the second plurality of rows is associated with a RFID tag of the second plurality of RFID tags and comprises an identifier of its associated RFID tag, the X coordinate and the Y coordinate at which its associated RFID tag had been disposed in the wearing surface layer before being worn away.

12. The product of claim 8, wherein said means for determining the measure of wear comprises:

means for classifying, from the received data, the RFIDs of the first and second plurality of RFID tags into N sets of RFIDs such that N is at least 2; and for set i of the N sets (i=1, 2, ..., N), means for computing a measure of wear TW(i).

13. The product of claim 12, wherein each set of the N sets is characterized by the X coordinate of all RFIDs in each set not deviating from each other by more than a predetermined threshold Sw, and wherein the special RFID tag stores an optimum maximum deviation among the X coordinates of all RFIDs in any same set of the N sets.

14. The product of claim 13, wherein said means for computing TW(i) comprises means for computing TW(i) as a function of YNmax(RFID(i)) and Ymax(RFID(i)), wherein YNmax(RFID(i)) is a maximum Y coordinate of all RFIDs in set i, and wherein Ymax(RFID(i)) is a maximum Y coordinate of the RFIDs in set i that are comprised by the first plurality of RFID tags.

* * * * *